(12) United States Patent
Kondamuri et al.

(10) Patent No.: US 11,258,760 B1
(45) Date of Patent: Feb. 22, 2022

(54) STATEFUL DISTRIBUTED WEB APPLICATION FIREWALL

(71) Applicant: VMware, Inc., Palo Alto, CA (US)

(72) Inventors: Chandra Sekhar Kondamuri, San Jose, CA (US); Abhijeet Joglekar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 237 days.

(21) Appl. No.: 16/173,900

(22) Filed: Oct. 29, 2018

Related U.S. Application Data

(60) Provisional application No. 62/688,766, filed on Jun. 22, 2018.

(51) Int. Cl.
*H04L 29/06* (2006.01)

(52) U.S. Cl.
CPC ...... *H04L 63/0254* (2013.01); *H04L 63/0263* (2013.01); *H04L 63/101* (2013.01)

(58) Field of Classification Search
CPC ............ H04L 63/0254; H04L 63/0263; H04L 63/101
USPC ............................................ 726/14
See application file for complete search history.

(56) References Cited

U.S. PATENT DOCUMENTS

| | | |
|---|---|---|
| 6,304,967 B1 | 10/2001 | Braddy |
| 8,204,061 B1 | 6/2012 | Sane et al. |
| 8,213,336 B2 | 7/2012 | Smith et al. |
| 8,229,468 B1 | 7/2012 | Robinson |
| 8,352,608 B1 | 1/2013 | Keagy et al. |
| 9,407,692 B2 | 8/2016 | Rajagopalan et al. |
| 9,477,500 B2 | 10/2016 | Basavaiah et al. |
| 9,483,286 B2 | 11/2016 | Basavaiah |
| 9,571,507 B2 | 2/2017 | Cooper et al. |
| 10,089,153 B2 | 10/2018 | Rajagopalan et al. |

(Continued)

FOREIGN PATENT DOCUMENTS

| | | |
|---|---|---|
| WO | 2014149148 A1 | 9/2014 |
| WO | 2014149149 A1 | 9/2014 |
| WO | 2015080825 A1 | 6/2015 |

OTHER PUBLICATIONS

Author Unknown, "Address Resolution Protocol," Aug. 13, 2014, 6 pages, Juniper Networks, retrieved from https://www.juniper.net/documentation/en_US/junose15.1/topics/topic-map/ip-arp.html.

(Continued)

*Primary Examiner* — Jacob Lipman
(74) *Attorney, Agent, or Firm* — Adeli LLP

(57) ABSTRACT

A method and system are disclosed. A first service engine among a plurality of service engines detects a traffic violation of a web application policy for an instantiation of a virtual service on the first service engine. The service engines maintain corresponding instances of a shared state of policy violations for the web application policy. In response to detecting the traffic violation, a first instance of the shared state on the first service engine is updated. The first service engine broadcasts the updated first instance of the shared state. Remaining service engines, which have instantiations of the virtual service, update their instances of the shared state in response to receiving the updated first instance. The instances of the shared state are aggregated to obtain an aggregated shared state. It is detected whether the aggregated shared state triggers an application policy rule for the web application policy.

26 Claims, 8 Drawing Sheets

(56) References Cited

U.S. PATENT DOCUMENTS

| | | |
|---|---|---|
| 10,637,914 B2 | 4/2020 | Basavaiah et al. |
| 10,771,318 B1 | 9/2020 | Haltore et al. |
| 2003/0009707 A1 | 1/2003 | Pedone et al. |
| 2003/0097610 A1 | 5/2003 | Hofner |
| 2005/0132030 A1 | 6/2005 | Hopen et al. |
| 2005/0256971 A1 | 11/2005 | Colrain et al. |
| 2006/0179147 A1 | 8/2006 | Tran et al. |
| 2007/0204341 A1* | 8/2007 | Rand .............. G06Q 10/107 726/22 |
| 2010/0262650 A1 | 10/2010 | Chauhan et al. |
| 2010/0293281 A1 | 11/2010 | Tsimelzon et al. |
| 2011/0235645 A1 | 9/2011 | Sardar et al. |
| 2011/0271007 A1 | 11/2011 | Wang et al. |
| 2012/0033672 A1 | 2/2012 | Page et al. |
| 2012/0096269 A1 | 4/2012 | McAlister |
| 2012/0110185 A1 | 5/2012 | Ganesan et al. |
| 2012/0117621 A1 | 5/2012 | Kondamuru et al. |
| 2012/0144014 A1 | 6/2012 | Natham et al. |
| 2012/0155266 A1 | 6/2012 | Patel et al. |
| 2012/0224486 A1 | 9/2012 | Battestilli et al. |
| 2013/0044764 A1 | 2/2013 | Casado et al. |
| 2013/0058225 A1 | 3/2013 | Casado et al. |
| 2013/0060929 A1 | 3/2013 | Koponen et al. |
| 2013/0067556 A1* | 3/2013 | Minear .............. H04L 63/02 726/11 |
| 2013/0086582 A1 | 4/2013 | Cardona et al. |
| 2013/0185586 A1 | 7/2013 | Vachharajani et al. |
| 2013/0305343 A1* | 11/2013 | Krywaniuk .......... H04L 63/02 726/11 |
| 2014/0040551 A1 | 2/2014 | Blainey et al. |
| 2014/0068608 A1 | 3/2014 | Kulkarni |
| 2014/0140221 A1 | 5/2014 | Manam et al. |
| 2014/0188795 A1 | 7/2014 | Alewine et al. |
| 2014/0207968 A1 | 7/2014 | Kumar et al. |
| 2014/0211607 A1 | 7/2014 | Li et al. |
| 2014/0280499 A1 | 9/2014 | Basavaiah et al. |
| 2014/0282526 A1 | 9/2014 | Basavaiah et al. |
| 2015/0149635 A1 | 5/2015 | Rajagopalan et al. |
| 2015/0212909 A1 | 7/2015 | Sporel |
| 2016/0077936 A1 | 3/2016 | Tang et al. |
| 2016/0269427 A1* | 9/2016 | Haugsnes .......... G06F 9/45558 |
| 2016/0359782 A1* | 12/2016 | Son ..................... H04L 51/12 |
| 2016/0381126 A1 | 12/2016 | Basavaiah et al. |
| 2017/0031725 A1 | 2/2017 | Rajagopalan et al. |
| 2017/0078150 A1 | 3/2017 | Koganti et al. |
| 2018/0143885 A1 | 5/2018 | Dong et al. |
| 2019/0020656 A1 | 1/2019 | Arjun et al. |
| 2019/0103762 A1* | 4/2019 | Dolezilek ......... H02J 13/00006 |
| 2020/0259889 A1 | 8/2020 | Basavaiah et al. |
| 2021/0014106 A1 | 1/2021 | Haltore et al. |

OTHER PUBLICATIONS

Non-Published commonly Owned U.S. Appl. No. 16/858,664, filed Apr. 26, 2020, 58 pages, VMware, Inc.

* cited by examiner

STATEFUL DISTRIBUTED WEB APPLICATION FIREWALL

CROSS REFERENCE TO OTHER APPLICATIONS

This application claims priority to U.S. Provisional Patent Application No. 62/688,766 entitled STATEFUL DISTRIBUTED WEB APPLICATION FIREWALL filed Jun. 22, 2018 which is incorporated herein by reference for all purposes.

BACKGROUND OF THE INVENTION

Computer networks are increasingly used to provide access to applications in commerce and industry. In large-scale networks such as data centers and enterprise networks, high volumes of traffic can be transmitted and received. To accommodate a large volume of traffic, the traffic for an application may be routed through and processed by multiple virtual machines and/or servers.

Security of networks is desired to be maintained. For example, networks may require validation via passwords for traffic to be admitted to the network. The types of requests and data carried in the request may also be monitored and access to the network prevented in some cases. In large-scale networks, security is complicated by the volume of traffic and the distributed nature of network. In such a distributed network, large volumes of traffic may be handled by sending incoming requests to multiple servers and servicing the requests using different virtual machines without regard to the client initiating the request. Consequently, an attacker failing in penetrating the network with one request may be successful with another request serviced by a different portion of the network. A mechanism for ensuring the security of large-scale networks against attack, while allowing the network to remain capable of servicing large volumes of traffic is desired.

BRIEF DESCRIPTION OF THE DRAWINGS

Various embodiments of the invention are disclosed in the following detailed description and the accompanying drawings.

DETAILED DESCRIPTION

Figure 1:
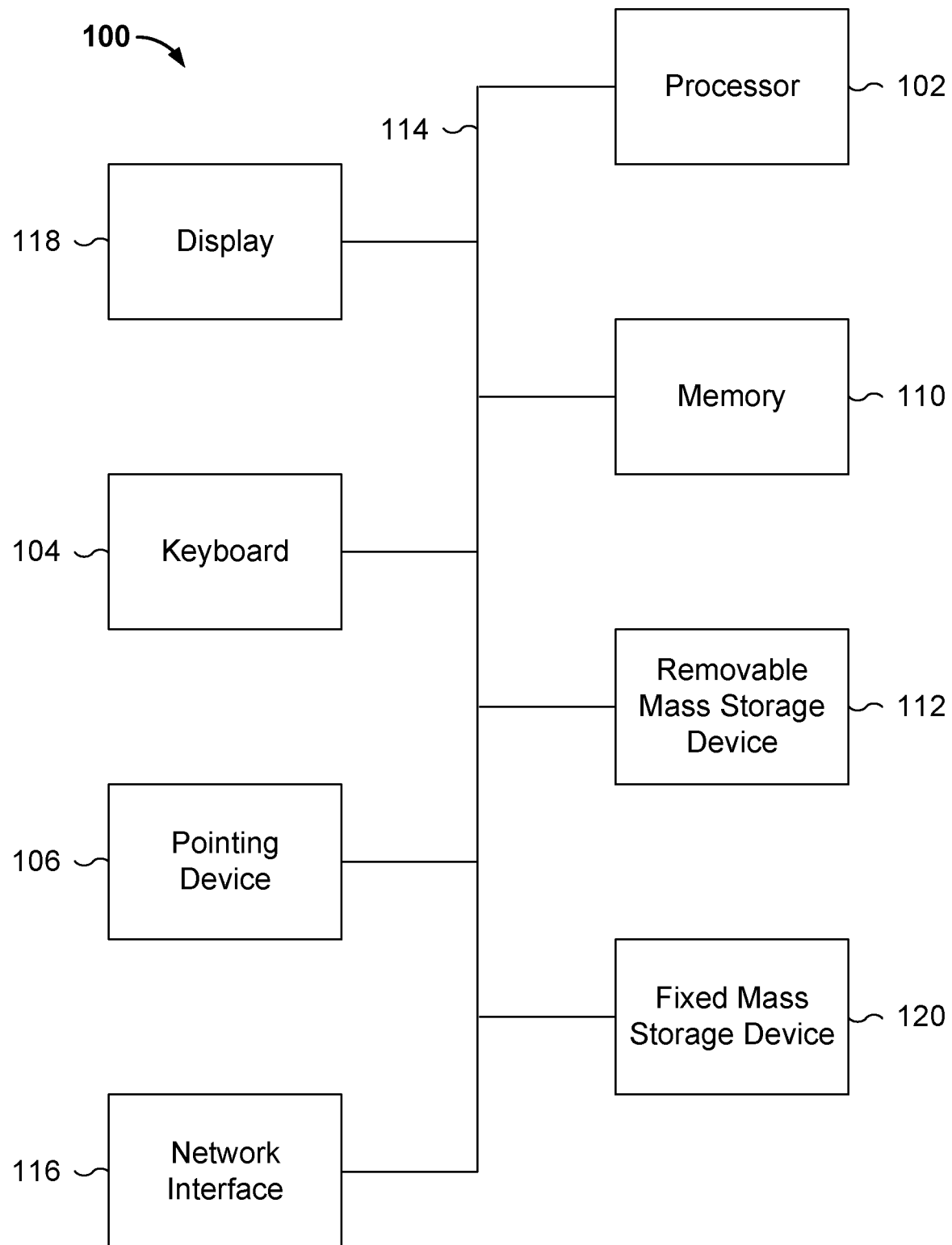
FIG. 1 is a functional diagram illustrating a programmed computer system for providing a stateful distributed network firewall in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A stateful distributed firewall technique is disclosed. The technique includes detecting, at a first service engine among a plurality of service engines, a traffic violation of a web application policy for an instantiation of a virtual service on the first service engine. The remaining service engines have corresponding instantiations of the virtual service. The plurality of service engines maintains a corresponding plurality of instances of a shared state of policy violations for the web application policy. In response to the detecting of the traffic violation, a first instance of the shared state on the first service engine is updated. The first service engine broadcasts the updated first instance of the shared state. Remaining service engines of the plurality of service engines update their corresponding instances of the shared state in response to reception of the updated first instance of the shared state. The instances of the shared state are aggregated to obtain an aggregated shared state. It is detected whether the aggregated shared state triggers an application policy rule for the web application policy.

FIG. 1 is a functional diagram illustrating a programmed computer system usable in a system for maintaining a stateful distributed web application firewall in accordance with some embodiments. As will be apparent, other computer system architectures and configurations can be used to manage a web application firewall. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Although described as a single processor, processor 102 may include multiple processors. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2, methods 300 and 320 and distributed platform 400.

Processor 102 is coupled bi-directionally with memory 110, which can include a first primary storage, typically a random access memory (RAM), and a second primary storage area, typically a read-only memory (ROM). Primary storage can be used as a general storage area and as scratch-pad memory, and can also be used to store input data and processed data. Primary storage can also store programming instructions and data, in the form of data objects and text objects, in addition to other data and instructions for processes operating on processor 102. Primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
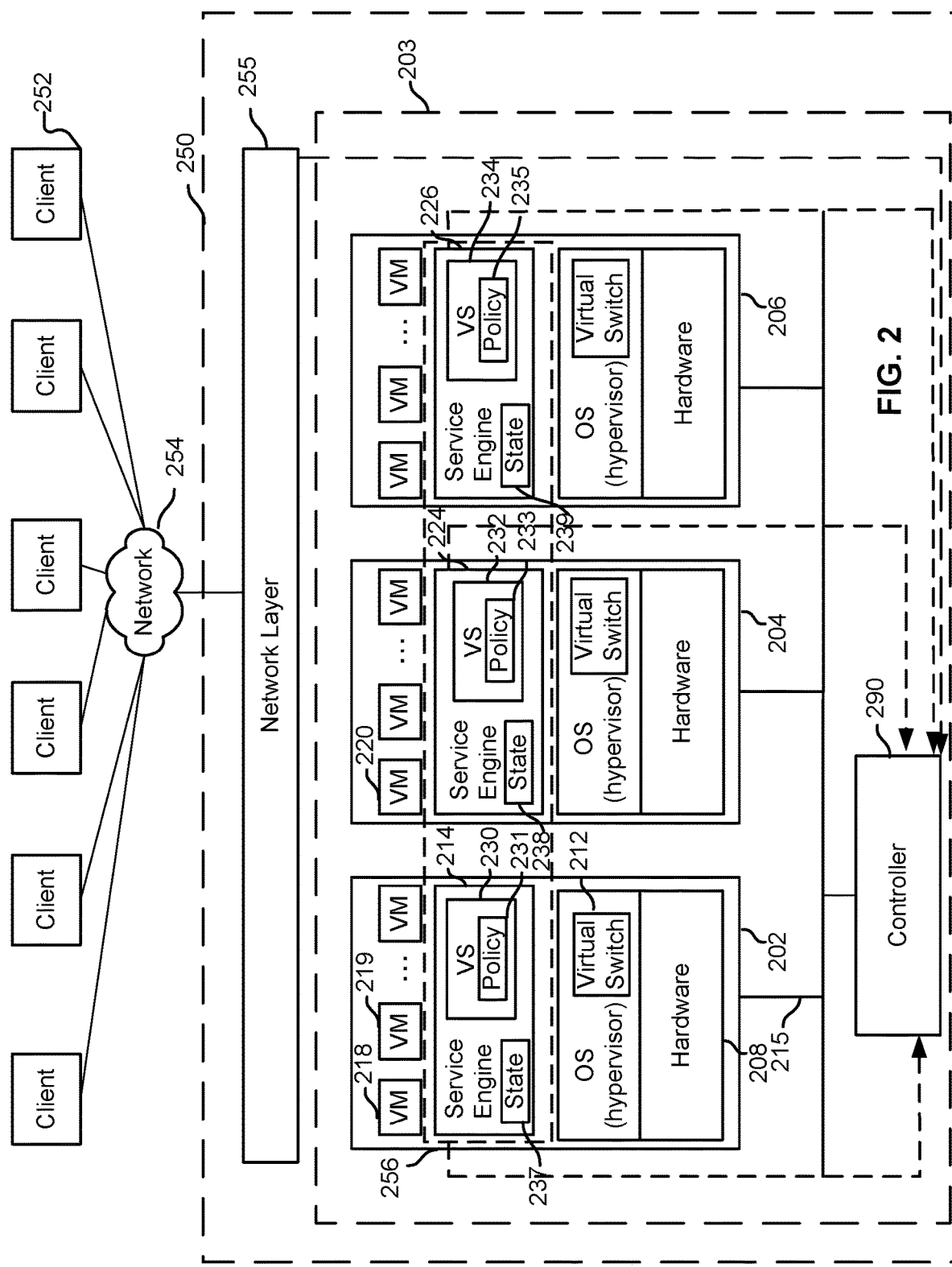
FIG. 2 is a block diagram illustrating an embodiment of a system including a distributed network service platform that provides a stateful web application firewall policy.

FIG. 2 is a block diagram illustrating an embodiment of a system including a distributed network service platform that can include a stateful web application firewall. Both hardware components and software components are depicted in FIG. 2. In this example, client devices such as 252 connect to a data center 250 via a network 254. A client device can be a laptop computer, a desktop computer, a tablet, a mobile device, a smart phone, a wearable networking device, or any other appropriate computing device. Network 254 can be the Internet, a private network, a hybrid network, or any other communications network.

In the example shown, a network layer 255 comprising networking devices such as routers, switches, etc. forwards requests from client devices 252 to a distributed network service platform 204. In this example, distributed network service platform 203 includes a number of servers configured to provide a distributed network service. A physical server (e.g., 202, 204, 206, etc.) has hardware components and software components, and can be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute within the VMs. Examples of such applications include web applications such as shopping cart, user authentication, credit card authentication, email, file sharing, virtual desktops, voice/video streaming, online collaboration, and many others.

One or more service engines (e.g., 214, 224 and 226) are instantiated on a physical device. Although three service engines 214, 224 and 226 are shown, another number may be instantiated on the physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components. For example, a load balancer component may be executed to provide load balancing logic to distribute traffic load amongst instances of applications executing on the local physical device as well as other physical devices; a metrics agent component may be executed to gather metrics associated with traffic, performance, etc. associated with the instances of the applications, etc. Generally, a virtual service is a component that is executed to provide services (in particular networking services such as firewall, load balancing, security, calculation of metrics etc.) for the corresponding application. Many other service components may be implemented and enabled as appropriate. When a specific service is desired, a corresponding service component is configured and invoked by the service engine to execute in a VM.

Service engines 214, 224 and 226 also implement instances (or instantiations) 230, 232 and 234 of one or more virtual service(s). Instantiations 230, 232 and 234 of the virtual service(s) may be seen as virtual machines executing in the context of the corresponding service engine 214, 224 and 226, respectively. A virtual service is a focal point of one or more applications on service engine 214, 224 and 226 and provides network services for the application. In some embodiments, a single application corresponds to a single virtual service. Multiple instances of the same virtual service can be instantiated on different devices. For example, the same virtual service can be instantiated on service engine 214 and service engine 224 if both service engines 214 and 224 handle traffic for the application associated with the virtual service. The actual number and distribution of the virtual services depends on system configuration, run-time conditions, etc. Running multiple instantiations of the virtual service as separate virtual machines may provide better reliability and more efficient use of system resources. Although only a single instantiation 230, 232 and 234 of virtual service(s) are shown on each service engine 214, 224 and 226, another number of instantiations for other virtual services may be executed on the service engines 214, 224 and/or 226.

Each instantiation 230, 232 and 234 of a virtual service has one or more policies associated with the virtual service and, therefore, with the corresponding application. The policies 231, 233 and 235 shown are web application firewall policies (hereinafter web application policy) that are enforced in a stateful manner, as discussed below. As described herein, instantiations 230, 232 and 234 are for the same virtual service. Thus, policies 231, 233 and 235 are the same. In other embodiments, one or more of instantiations 230, 232 and 234 may be for different virtual service(s) and/or one or more of the policies 231, 233 and 235 may be different.

Each service engine 214, 224 and 234 also includes instances 237, 238 and 239 of a shared state. The shared state stores the violations of the policies 231, 233 and 235 for all service engines 214, 224 and 234 having instantiations 230, 232 and 234 of the same virtual service. Service engines 214, 224 and 234 update the instances 237, 238 and 239 of the shared state as described herein to maintain a consistent and accurate view of the traffic violations for the distributed system 250. More specifically, a service engine updates its instance of the shared state in response to detecting a violation for the service engine (e.g. its own violations) and in response to receiving a broadcast from another service engine with an update of the other service engine's shared state (e.g. other service engines' violations).

Controller 290 is configured to control, monitor, program, and/or provision the distributed network services and virtual machines. For example, controller 290 can be used to configure instantiations 230, 232 and 234 of virtual service(s). Thus, controller 290 can define policies 231, 233 and 235 and their corresponding rules. Controller 290 can be implemented as software, hardware, firmware, or any combination thereof. In some embodiments, controller 290 is implemented on a system such as 100. In some cases, controller 290 is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

In the example shown, traffic received on a physical port of a server (e.g., a communications interface such as Ethernet port 215) is sent to a virtual switch (e.g., 212). In some embodiments, the virtual switch is configured to use an application programming interface (API) provided by the hypervisor to intercept incoming traffic designated for the application(s) in an inline mode and send the traffic to an appropriate service engine. In inline mode, packets are forwarded on without being replicated. As shown, the virtual switch passes the traffic to a service engine in the distributed network service layer (e.g., the service engine on the same physical device). Service engine 214, 224 and/or 226, based on factors such as policies 231, 233, and/or 235 and operating conditions, may redirect the traffic to an appropriate application executing in a VM on a server, block incoming traffic or take other appropriate action.

The components and arrangement of distributed network service platform 204 described above are for purposes of illustration only. The technique described herein is applicable to network service platforms having different components and/or arrangements.

Figure 3:
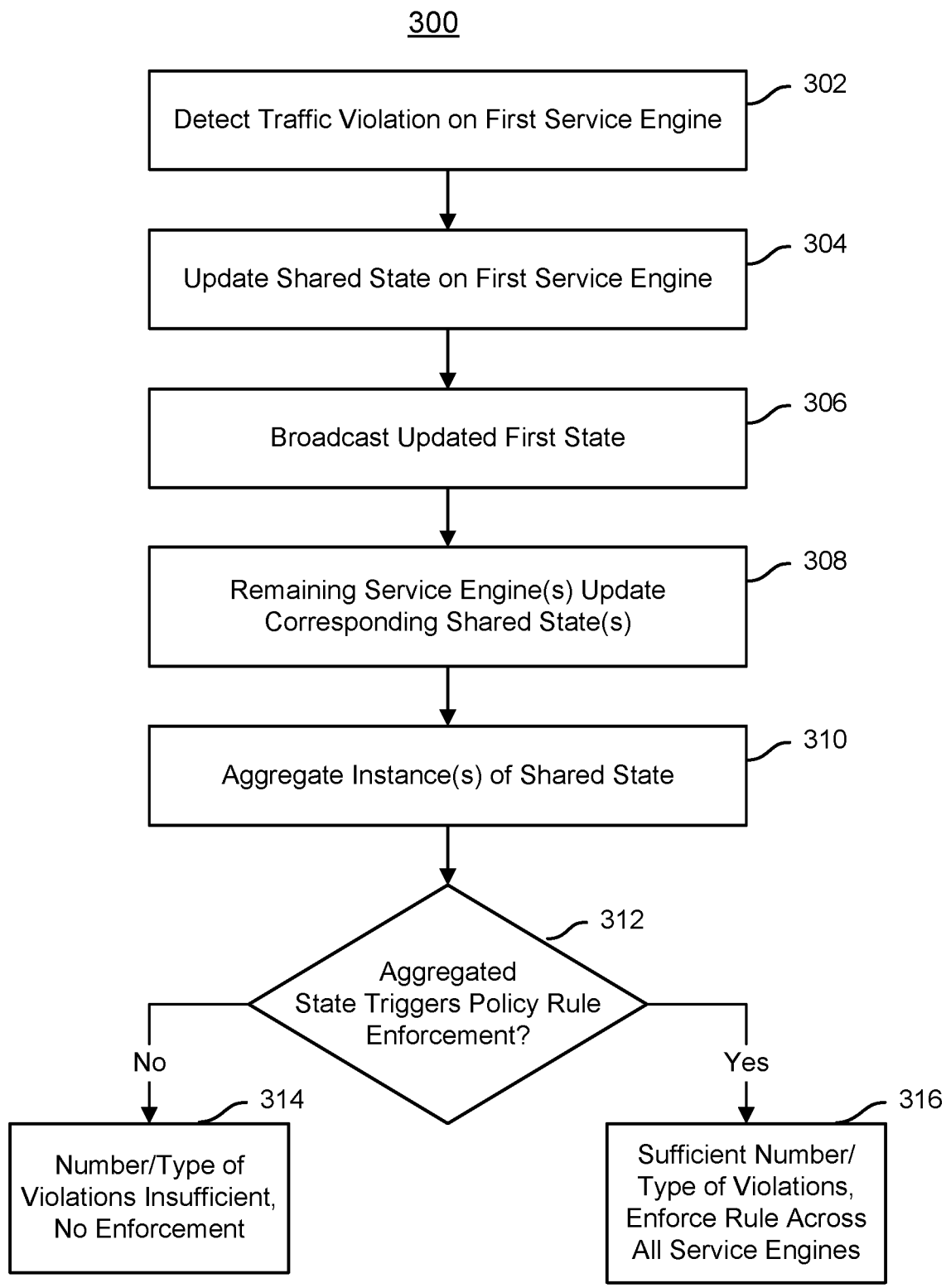
FIG. 3 is flow chart depicting an embodiment of a method for providing a stateful web application firewall policy.

FIG. 3 is flow chart depicting an embodiment of method 300 for providing a stateful web application firewall policy. A stateful web application firewall policy incorporates knowledge of the status of violations of the web application firewall policy in each service engine implementing the web application firewall policy and enforces penalties for violations across all service engines implementing the web application firewall policy. Method 300 may be performed using processor(s) 102 executing instructions from memory 110. Method 300 is described in the context of the system 200. For the purposes of explaining method 300, instances 230, 232 and 234 are considered to be for the same virtual service. The virtual service provides networking services (e.g. firewall, load balancing) for a particular application. Web application policies 231, 233 and 235 are thus the same policy. In other embodiments, other and/or additional components may be used to perform method 300 and method 300 may be used in conjunction with other systems.

A traffic violation of a web application policy is detected at a first service engine, at 302. An example of a web application policy includes a firewall policy for a web-based application such as a payment transaction application. A traffic violation includes any aspect of a request processed by the service engine that is defined by the web application policy to be prohibited and/or to carry some penalty. Suppose, for example, a client 252 of FIG. 2 provides a request for the application. This request happens to be routed to service engine 214. At 302, service engine 214 inspects the request and determines whether the request violates web application policy 231 (e.g., the request is coming from a blacklisted client IP or the request includes content prohibited by web application policy 231 such as certain graphical content). If the request does not violate policy 231, the request is passed along for service and method 300 terminates. If the request does violate policy 231, then method 300 continues.

In response to detecting the traffic violation, the instance of the shared state on the first service engine is updated, via 304. The shared state stores the status of violations for the virtual service for all service engines having instantiations of the virtual service. An instance of the shared state is the copy of the shared state on one of the service engines. At 304, the instance of the shared state is updated to store the violation detected at the service engine. For example, instance 237 of the shared state on service engine 214 is updated in response to the service engine 214 detecting a violation. Thus, updated instance 237 of the shared state in service engine 214 reflects (e.g., stores) the violation for service engine 214.

In response to the update, an updated instance of the shared state is broadcast by the first service engine, at 306. For example, instance 237 of the shared state is broadcast by service engine 214. Remaining service engines having instantiations of the virtual service receive the updated instance that is broadcast, at 308. Also at 308, the remaining service engines update their corresponding instances of the shared state. Thus, remaining service engines 224 and 226 receive the update from service engine 214 and are made aware of the violation at service engine 214 through the shared states. In response to receiving the update, remaining service engines 224 and 226 update their corresponding instances 238 and 239 of the shared state. Consequently, the instances 237, 238 and 239 of the shared state all reflect the new violation for service engine 214 as well as previous violations at service engines 214, 224 and 226. Thus, the method 302 allows the instances 327, 238 and 239 of the shared state to be synchronized such that each service engine 214, 224 and 226 stores violations for all service engines 214, 224 and 234.

The instances of the shared state are aggregated to obtain an aggregated shared state, at 310. The aggregated state indicates the violations for the virtual service as a whole across all service engines having instantiations of the virtual service. For example, the aggregated state for each instance 237, 238 and/or 239 of the shared state indicates the violations for the virtual service for all service engines 214, 224 and 226 having instantiations 230, 232 and 234 of the virtual service. Both the number and type of violations for may be indicated by the aggregated shared state.

It is detected whether the aggregated shared state triggers enforcement an application policy rule, at 312. If the aggregated shared state indicates that an insufficient number and type of violation has occurred, then, at 314, the rule is not triggered and the process terminates. If the number or type of violation across all service engines 214, 224 and 226 is sufficient to trigger the rule, then, at 316, the rule may be enforced across all service engines 214, 224 and 226 having instantiations 230, 232 and 234 of the virtual service. For example, in response to the aggregated shared state indicating that a sufficient number of requests that are violations have been received from a particular client 252, the rule is triggered and traffic from client 252 blocked by all service engines 214, 224 and 226.

Using method 300, a stateful web application policy may be maintained for distributed service platform. Because a distributed service platform is used, large volumes of traffic may be managed in a scalable manner. Because the web application policy is stateful, traffic violations which occur on one service engine 214 become known at remaining service engines 224 and 226. This is achieved by broadcasts of updates to the instances 237, 238 and 239 of the shared state. Stated differently, each service engine 214, 224 and 226 is aware of not only their own traffic violations, but also the state of traffic violations at the other service engines 214, 224 and 226. Further, because the web application policy is stateful, the rules are imposed across all service engines 214, 224 and 226 in response to a particular aggregated shared state indicating sufficient violations have occurred. Consequently, network security may be maintained in a scalable distributed system capable of servicing large amounts of traffic.

Figure 4:
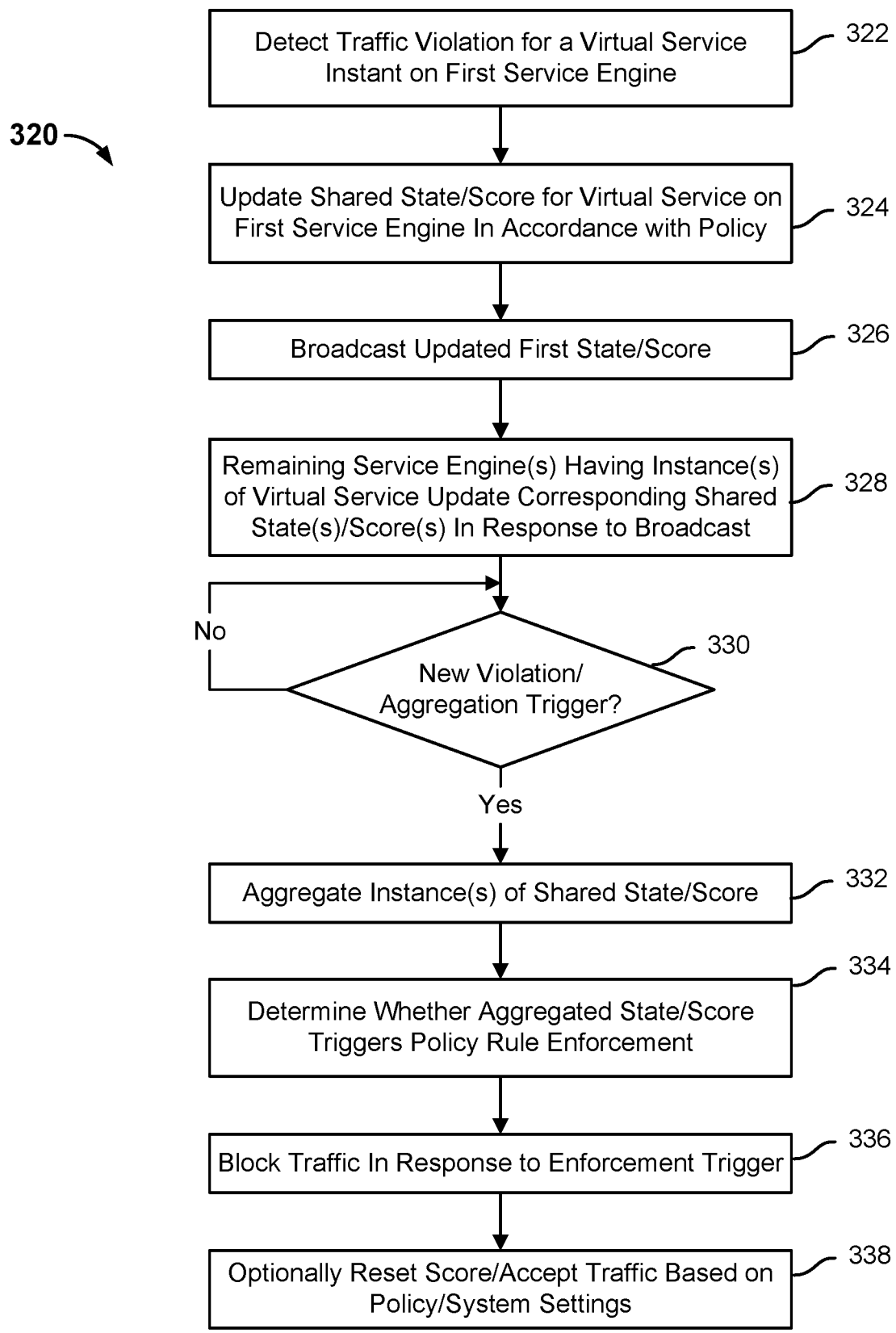
FIG. 4 is flow chart depicting another embodiment of a method for providing a stateful web application firewall policy.
Figure 5:
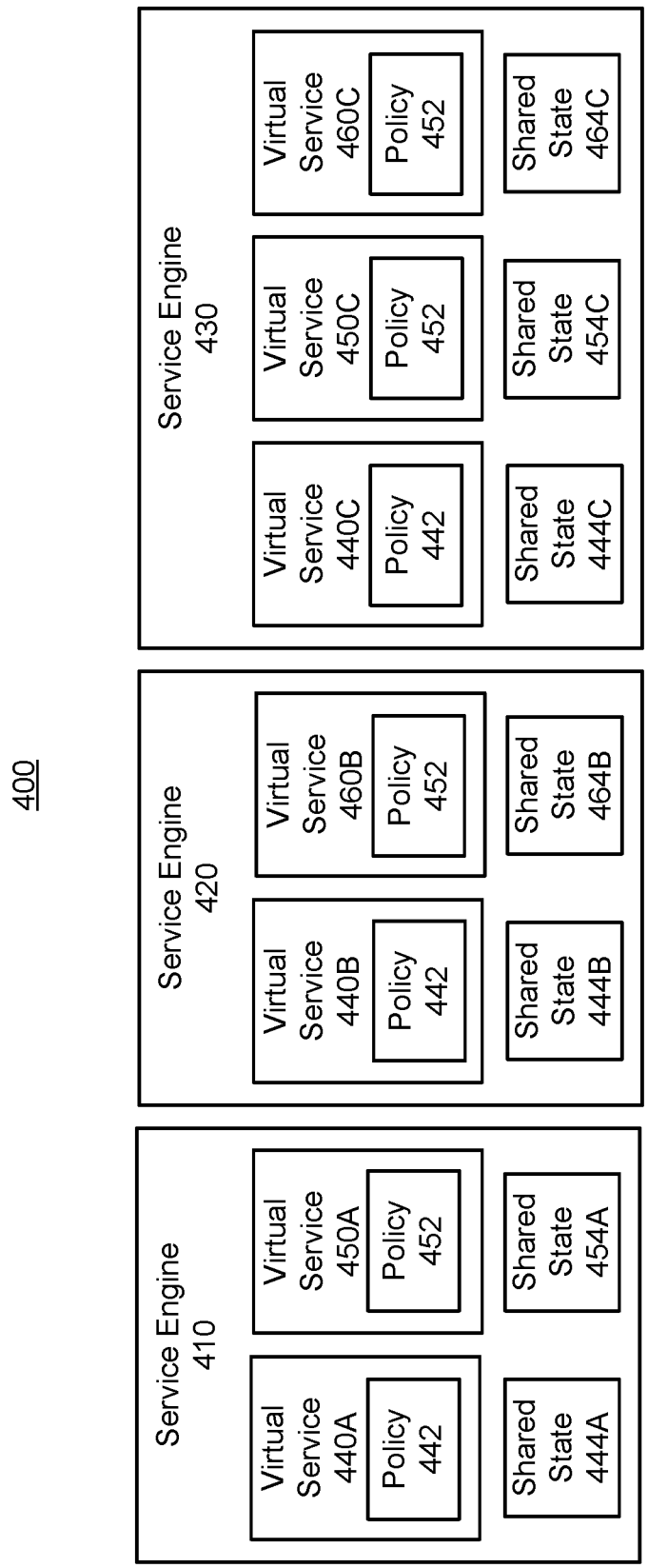
FIGS. 5-11 are diagrams illustrating an embodiment of a portion of a distributed network service platform that can provide a stateful web application firewall policy.

FIG. 4 is flow chart depicting an embodiment of method 320 for providing a stateful web application firewall policy. Method 320 may be performed using processor(s) 102 executing instructions from memory 110. In some embodiments, process 300 may be implemented using the service engines 214, 224, 226, 410, 420 and/or 430 (described below).

A traffic violation of a web application policy is detected at a first service engine, at 322. Determination of whether traffic violates a policy at 322 may include utilizing rules for web application policies to inspect incoming traffic. Rules may check signatures in web traffic, parsing HTTP URI, parameters, header, body, session history and other aspects of incoming traffic. Rules may be configurable and sufficiently flexible for individualized determination of what constitutes a violation and the action taken in response to a violation. For example, a first virtual service might be associated with traffic from clients within a secure network, while a second virtual service is associated with traffic from outside the secure network. Rules for a first web application policy for the first virtual service associated with the secure network may thus be less stringent than rules for a second web application policy for the second virtual service associated with traffic outside the network. For example, the first web application policy for the secure network may indicate that only requests having certain embedded code violate first web application policy. The second web application policy for traffic from outside the secure network may indicate that any request including graphical content and/or the embedded code violates the second web application policy. In response to a request for the first virtual service from a client within the secure network, the service engine determines whether the request includes the embedded code specified in web application policy. If not, the request is passed along for service. If the request does include the embedded code, the request violates the first web application policy. In response to a request for the second virtual service from a client outside the secure network, the service engine not only determines whether the request includes the embedded code, but also if the request includes graphical content. Only if the request includes neither the graphical content nor the embedded code does service engine pass the request along for service. Otherwise, it is determined that the request violates the second web application policy. Traffic from a client that violates a web application policy results in service engine determining that a traffic violation has occurred for the web application policy of the virtual service.

In response to detecting the traffic violation, the instance of the shared state on the service engine is updated, via 324. In some embodiments, each instance of the shared state is a key-value pair. The key identifies the requesting client and virtual service. The value includes a score indicating the number and type of traffic violations for each service engine having an instantiation of the virtual service. For example, the key may be of the format <client address>.<collection-name>.<rule-variable>. The value may be of the format <service engine-uuid-1>:<violation-score>, <service engine-uuid-2>:<violation-score>, <service engine-uuid-3>:<violation-score>. The appropriate key-value pair for the service engine is updated at 324. Thus, a service engine updates its own score in response to detecting a traffic violation.

In response to the update, an updated instance of the shared state is broadcast by the service engine, at 326. The service engine broadcasts a message to remaining service engines that share the virtual service indicating that the appropriate key-value pair for service engine has been updated. The message thus includes the updated score for service engine.

The remaining service engines having instantiations of the virtual service receive the updated instance of the shared state that is broadcast, via 328. Also at 328, remaining service engines update their instances of the shared state for that virtual service. Thus, the message indicating the new key-value pair with the updated value is received by remaining service engines at 328. The score for the service engine detecting the violation/broadcasting its shared state is updated in appropriate key-values pairs in instances of the shared state on the remaining service engines. Service engines thus update the score for another service engine in response to receiving a broadcast message from the other service engine. Consequently, the key-value pairs for the service engines having instantiations of the same virtual service are synchronized at 328. All service engines now have the same key-value pair for the virtual service.

It is detected whether aggregation of the shared state has been triggered, at 330. In some embodiments, aggregation of the shared state is triggered by any new request from the client for the virtual service or by a new violation of the web application policy for the virtual service. In such embodiments, a request that can or does result in an update to an instance of the shared state triggers the aggregation. In other embodiments, aggregation is performed in response to another stimulus. For example, the aggregation may be performed in response to an instance of the shared state (e.g. the score) being updated, an instance of the updated shared state being broadcast, an instance of the updated shared state being received, and/or after expiration of a particular interval.

In response to the trigger being detected, the instance of the shared state on a service engine is aggregated to obtain an aggregated shared state, at 332. The aggregation determines the violations for the virtual service as a whole across all service engines having instantiations of the virtual service. For example, suppose that an aggregation is triggered by reception of another request from the same client. The service engine receiving the request for the virtual service aggregates the shared state. In some embodiments, aggregation includes performing a summation of all of the scores for all of the service engines having instantiations of the virtual service.

It is detected whether the aggregated shared state triggers an application policy rule that provides a penalty, at 334. In some embodiments, the web application policy indicates that any violation results in a rule for the policy being triggered. In such a case, a score greater than zero triggers the rule. In other embodiments, there is some tolerance for violations. In such embodiments, the rule for the web application policy may indicate that a penalty is enforced if the aggregated score exceeds a nonzero threshold, such as one thousand. Thus, ten violations (for a score of 100 each) across any/all service engines are allowed before any penalty is triggered for the virtual service. At 334, therefore, the aggregated score may be checked to determine if the aggregated score exceeds the threshold.

In response to the policy being triggered, the rule is enforced, via 336. For example, suppose the rule for the web application policy indicates that the aggregated shared state exceeding one thousand results in traffic for a client being blocked (e.g. the client is blacklisted). At 336, the traffic from the client is no longer accepted at any service engine because the aggregated score exceeds one thousand. In order to allow flexibility in managing traffic, enforcement of the rule may be terminated, at 338. For example, the scores may be reset to zero after a particular time expires, a particular number of new requests from the client have been received/blocked and/or the administrator resets the score. Alternatively, the aggregated score that triggers enforcement may be adjusted up or down. Additional requests from the client can then be received and processed. Other mechanisms for resetting or changing enforcement of the rule may be used. Thus, at 338, traffic from the client may again be accepted by the system.

A stateful web application policy may be maintained for a scalable distributed service platform. Because the web application policy is stateful, traffic violations occurring on one service engine become known at all service engines having the same virtual service. Thus, the service engines have a consistent state due to the updates and broadcasts performed in method 320. Further, penalties may be enforced across all service engines regardless of which service engine experienced the violation triggering enforcement of a rule. This allows the service engines to remain in a coherent state and network security to be maintained. Further, a system employing method 320 may be resilient to drops of messages. Because each service engine maintains its own state accurately and broadcasts its state, eventually state information is broadcast across the system 400 even if some messages are dropped. Thus, a web application policy may be reliably maintained in a stateful manner in a scalable distributed system capable of servicing large amounts of traffic.

Operation of the method 320 may be further explained with reference to FIGS. 5-11. FIGS. 5-11 are diagrams illustrating embodiments of a portion of distributed service platform 400 that provides a stateful web application firewall policy using method 320. In some embodiments, the service engines in FIGS. 5-11 are a representative subset of the service engines in the entire distributed network. The service engines in system 400 are a statistically sufficient representation of a total number of service engines on which the virtual service is applied. The method 320 may be applied only to those service engines in the system 400 for detecting service violation. Thus, decisions regarding traffic violations may be made using a subset of the total number of service engines. However, enforcement or rules occurs across all service engines. In such embodiments, processing of traffic violations may be more efficient. In other embodiments, method 320 is performed for all service engines in a distributed network.

System 400 includes service engines 410, 420 and 430. Service engines 410, 420 and 430 are analogous to service engines 214, 224 and 226 depicted in FIG. 2. Service engines 410, 420 and 430 include instantiations of virtual services. Virtual services 440, 450 and 460 have instantiations shown in FIG. 5 but are not separately depicted in FIG. 5. However, virtual services 440, 450 and 460 are labeled within the text for ease of explanation. Virtual services 440, 450 and 460 perform network services for corresponding applications (also not shown). Instantiations 440A, 440B, 440C, 450A, 450C, 460B and 460C are virtual services executing in the context of the corresponding service engines 410, 420 and 430. Service engines 410, 420 and 430 include instantiations 440A, 440B and 440C, respectively, of virtual service 440. Service engines 410, 420 and 430 thus receive and process requests for the application corresponding to virtual service 440. Service engines 410 and 430 include instantiations 450A and 450C, respectively, of virtual service 450. Therefore, service engines 410 and 430 receive and process requests for the application corresponding to virtual service 450. Service engines 420 and 430 include instantiations 460B and 460C of virtual service 460. Consequently, service engines 420 and 430 receive and handle requests for the application corresponding to virtual service 460.

Each virtual service 440, 450 and 460 may include multiple policies related to managing network services for their corresponding applications. For simplicity, only web application policies that are firewalls are discussed and depicted. Virtual service 440 has attached web application policy 442. Thus, instantiations 440A, 440B and 440C of virtual service 440 each includes web application policy 442. Similarly, virtual service 450 has attached web application policy 452 shown in instantiations 450A and 450C. Virtual service 460 includes web application policy 452 shown in instantiations 460B and 460C. Thus, although virtual services 450 and 460 are different, they both use the same web application policy 452. Both virtual services 450 and 460 use the same rules, types and enforcement thresholds. Web application policies 442 and 452 are used to aid in maintaining security of the network to which distributed network service platform 400 belongs.

Service engines 410, 420 and 430 include instances 444A, 444B, 444C, 454A, 454C, 464B and 464C of shared states for virtual services 440, 450 and 460. Instances 444A and 454A of the shared states are used by service engine 410 to store state information for each service engine 410, 420 and 430 having instantiations of virtual services 440 and 450. Instances 444B and 464B of the shared states are used by service engine 420 to store states for each service engine 410, 420 and 430 having instantiations of virtual services 440 and 460. Instances 444C, 454C and 464C of the shared states are used by service engine 430 to store states for each service engine 410, 420 and 430 having virtual services 440, 450 and 460. Thus, instances 444A, 444B, 444C, 454A, 454C, 464B and 464C of shared states are used to provide a stateful web application firewall.

In operation, a request for virtual service 440 may be received by service engine 410. Service engine 410 then determines whether the traffic violates web application policy 442 at 322 of method 320. For example, rules for web application policy 442 might may indicate that any request including certain unwanted graphical content violates the web application policy 442. If the request from the client does not include the unwanted graphical content, service engine 410 passes the request along for service. If, however, traffic from the client includes the graphical content prohibited by web application policy 442, service engine 410 determines that a traffic violation has occurred for virtual service 440.

In response to detecting the traffic violation, service engine 410 updates instance 444A of the shared state to reflect a traffic violation detected at 322. As discussed above, the shared state can be a key-value pair. The key identifies the requesting client and virtual service. The value includes a score indicating the number and type of traffic violations for each service engine having an instantiation of the virtual service. For example, the key may be of the format <client address>.<collection-name>.<rule-variable>. The value may be of the format <service engine-uuid-1>:<violation-score>, <service engine-uuid-2>:<violation-score>, <service engine-uuid-3>:<violation-score>. The appropriate key-value pair for service engine 410 is updated at 324. For example suppose the incoming request includes the proscribed graphical content and that the rule for web application policy states that a score is to be updated by one hundred for each violation. The key-value pair for the requesting client and virtual service 440 has the score for service engine 410 incremented by one hundred at 324. For example, the value may be updated from:

service engine 410:0, service engine 420:200, service engine 430:300 to service engine 410:100, service engine 420:200, service engine 430:300.

Figure 6:
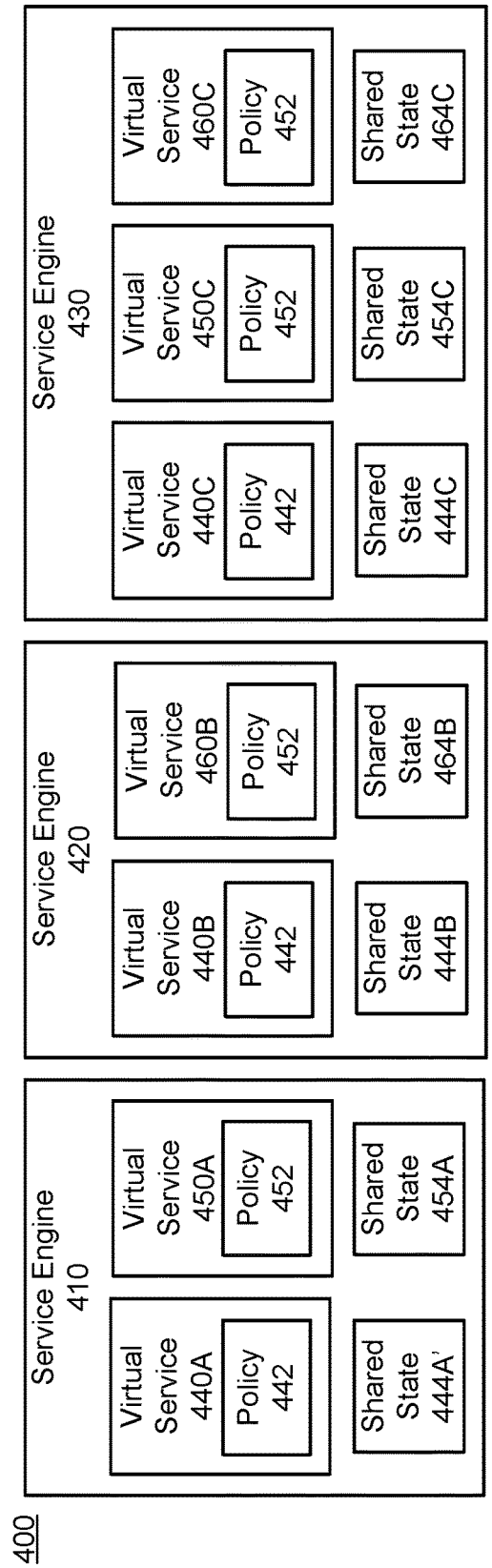

The scores for service engines 420 and 430 would not be incremented in the key-value pair because no additional violation is detected for service engines 420 and 430 and because each service engine only updates its own score in response to detecting its own violations. FIG. 6 depicts the system 400 after 324 is performed. Thus, instance 444A of the shared state has been updated with the new score and the new label 444A' is used to denote the updated instance of the shared state.

In response to the update, an updated instance of the shared state is broadcast by service engine 410, at 326. Service engine 410 broadcasts a message to service engines 420 and 430 that share virtual service 440 indicating that the appropriate key-value pair for service engine 410 has been updated. The message thus includes the updated score for service engine 410 (e.g., service engine 410:100).

Remaining service engines 420 and 430 having instantiations 440B and 440C of virtual service 440 receive the updated instance of the shared state that is broadcast, via 328. Also at 328, remaining service engines 420 and 430 update their instances 444B and 454C of the shared state in response to receiving the update. Thus, the score for service engine 410 is updated in appropriate key-values pairs in instances 444B and 444C of the shared state for service engines 420 and 430. Consequently, the key-value pairs for virtual service 440 having instantiations 440A, 440B and 440C on service engines 410, 420 and 430 are synchronized at 328. Thus, all service engines now have the following value for the key-value pair described above:
service engine 410:100, service engine 420:200, service engine 430:300.

Figure 7:
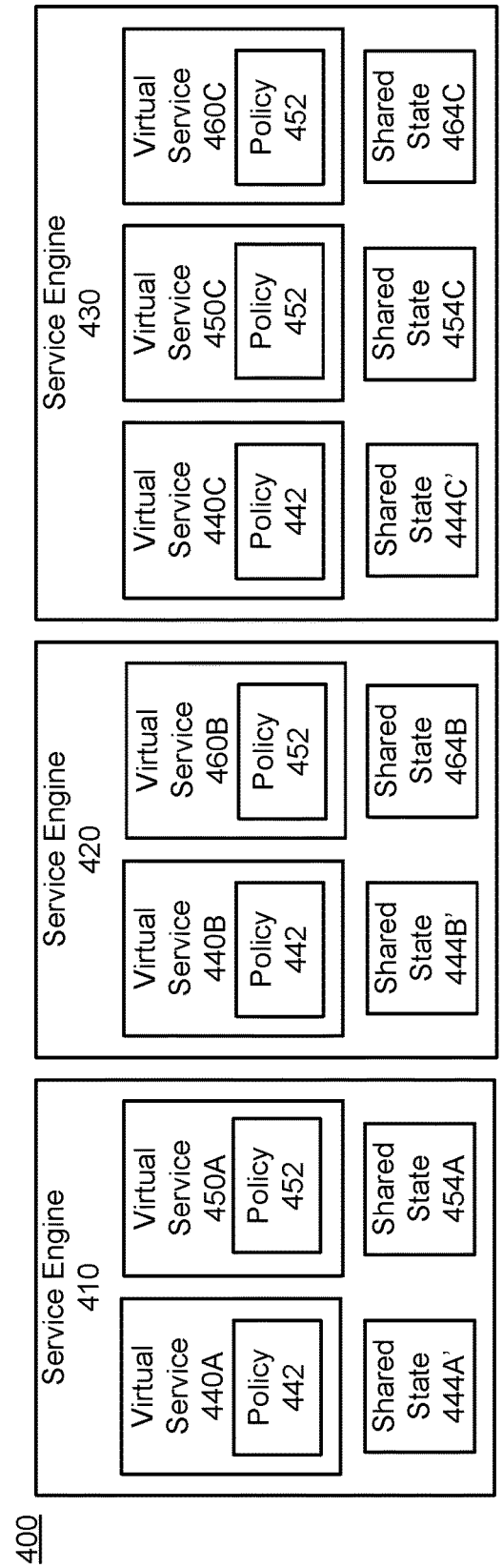

FIG. 7 depicts the system 400 after 328. Thus, instances 444B and 444C have been updated to include the updated shared state for service engine 410. New labels 444B' and 444C' are used to denote this update. In other words, the value for service engine 410 in the key-value pair for the requesting client and virtual service 440 has had its score incremented by one hundred in both instances 444B' and 444C' of the shared state. The remaining instances 464B, 454C and 464C of the shared state for other virtual services remain unchanged.

It is detected whether aggregation of the shared state has been triggered and if so, instances of the shared state are aggregated, at 330. For example, suppose that an aggregation is triggered by reception of another request for the application corresponding to virtual services 440 from the same client. Service engine 410, 420 or 430 receiving the request aggregates the instances of the shared state by performing a summation of all of the scores for all of service engines 410, 420 and 430 having instantiations 440A, 440B and 440C, respectively of virtual service 440.

It is detected whether the aggregated shared state triggers an application policy rule that provide a penalty, at 334. In some embodiments, the rule for web application policy 442 indicates that a penalty is enforced if the aggregated score exceeds one thousand. Thus, ten violations (for a score of 100 each) across any/all service engines 410, 420 and 430 in system 400 are allowed before any penalty is triggered for virtual service 440. At 334, therefore, the summed score may be checked at 334 to determine if the aggregated score exceeds one thousand.

In response to the policy being triggered, the rule is enforced, via 336. For example, suppose the rule for web application policy 442 indicates that the aggregated shared state exceeding one thousand results in traffic for a client being blocked. At 336, the traffic from the client is no longer accepted at any service engine 410, 420 and 430 if the aggregated score exceeds one thousand. As discussed above, to allow flexibility in managing traffic, enforcement of the rule may be terminated at 338.

Figure 8:
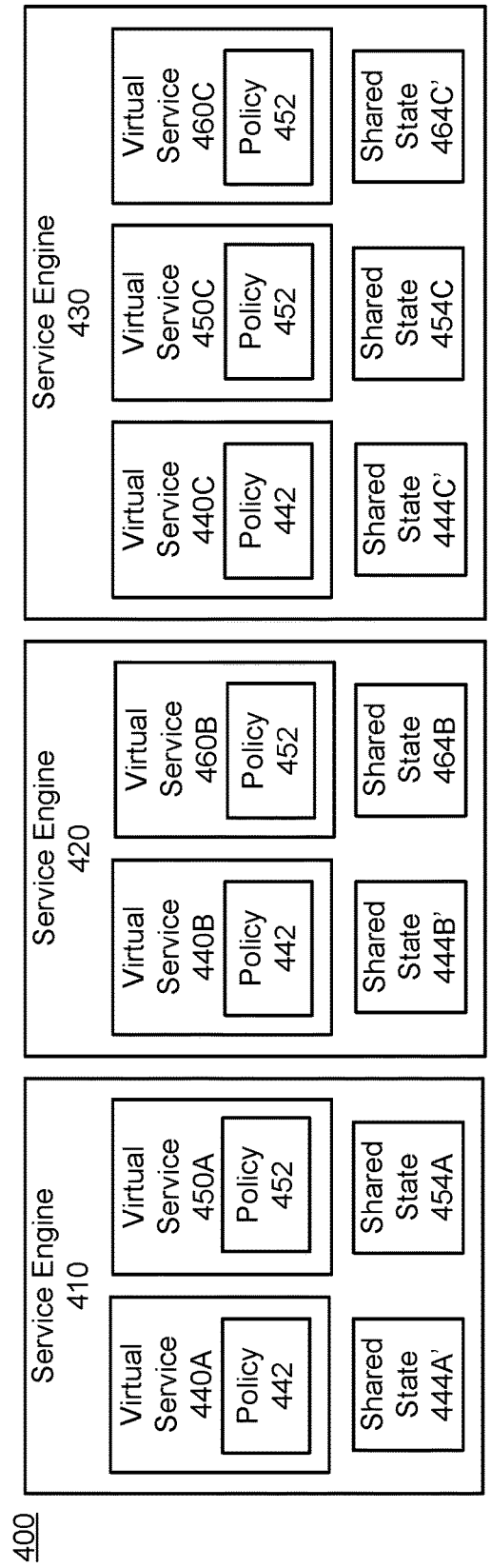

Method 320 is performed for all service engines 410, 420 and 430 and virtual services 440, 450 and 460. For example, after service engines 420 and 430 update instances 444B' and 444C' of the shared state as shown in FIG. 7, a request for an application corresponding to virtual service 460 is received by service engine 430. Suppose service engine 430 detects a violation of web application policy 452 at 322. Instance 464C of the shared state for service engine 430 is updated at 324. FIG. 8 depicts the system after this has occurred. Instance 464C of the shared state has thus been updated and this change denoted by new label 464C'. In some embodiments, a key-value pair for the (possibly new) requesting client and virtual service 460 has the score for service engine 430 incremented. Even though virtual service 450 shares the same policy 452 as virtual service 460, instance 454C of the shared state is not updated at 324. This is because virtual service 450 is different from virtual service 460. Thus, no traffic violation for virtual service 450 has been detected.

Figure 9:
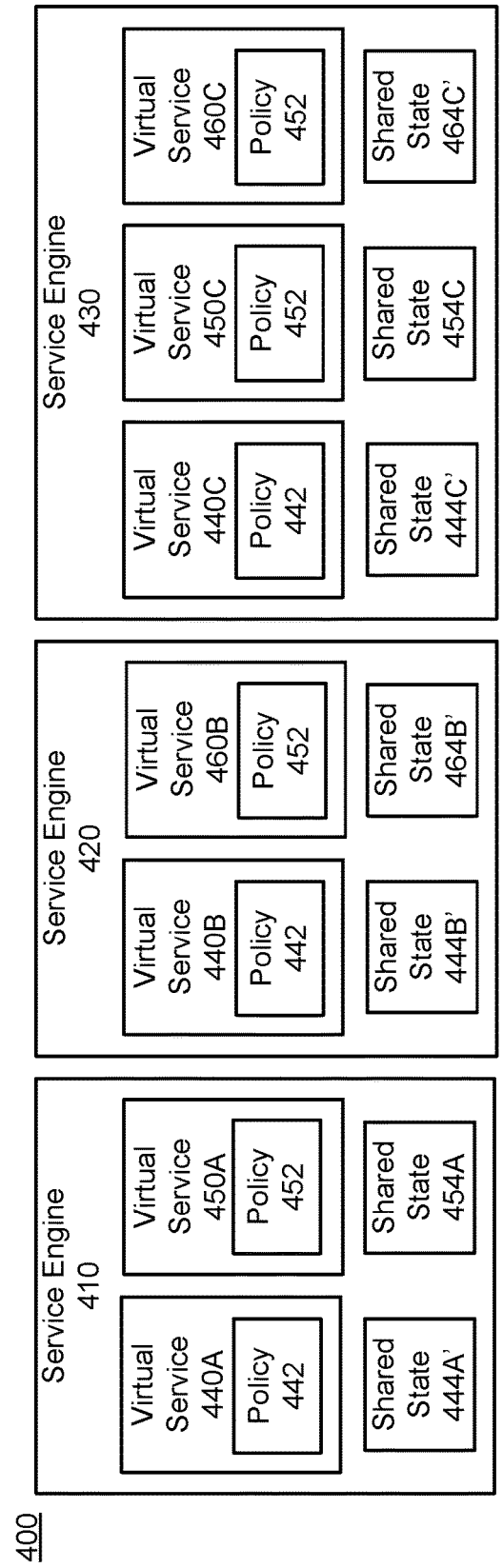

Service engine 430 then broadcasts its updated instance 464C' of the shared state, via 326. The updated instance of the shared state is received at service engine 420 that shares virtual service 460, at 328. Due to the broadcast, service engine 420 updates its own instance 464B of the shared state at 328. FIG. 9 depicts system 400 after step 328 has been performed for service engine 420 and virtual service 460. Thus, instance 464B of the shared state has been updated and this change indicated by new label 464B'. The appropriate key-value pair has the score for service engine incremented for instance 464B'. The instances 464B' and 464C' are synchronized.

Figure 10:
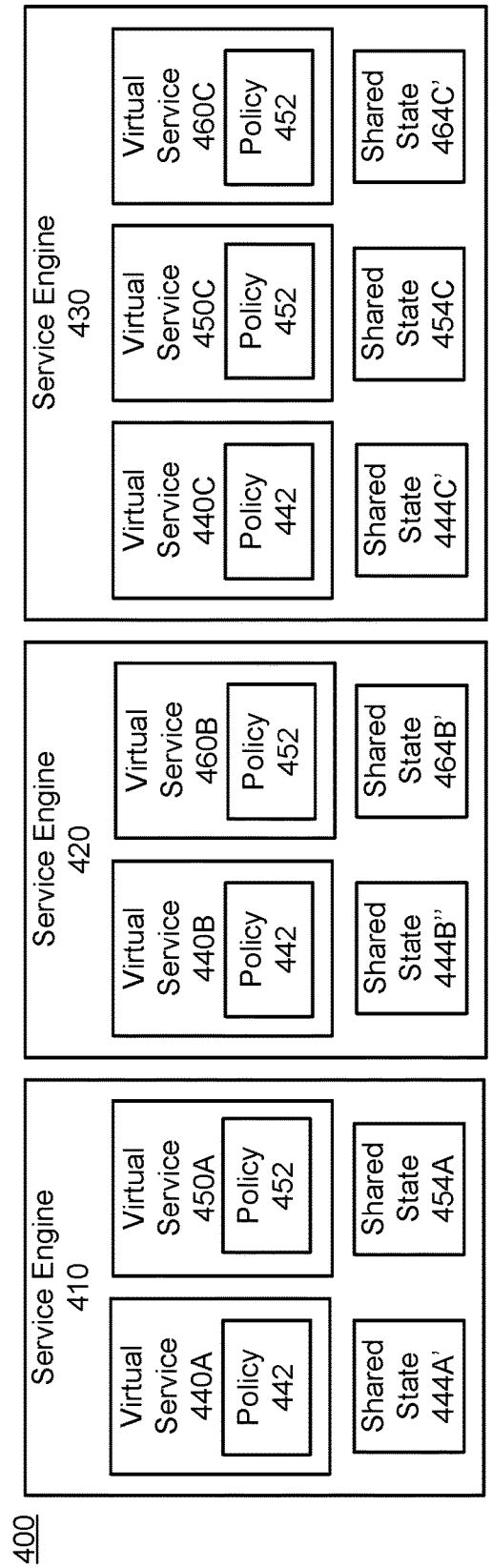
Figure 11:
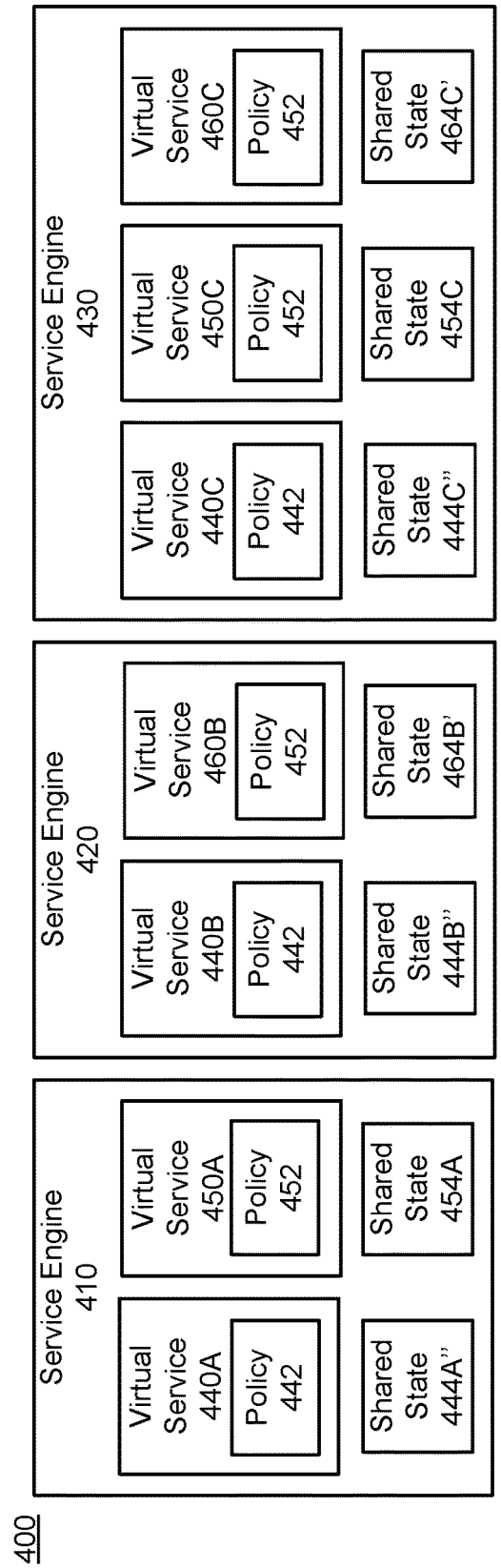

Similarly, service engine 420 receives another request for virtual service 440 and determines that the request is a violation of web application policy 442, at 322. Service engine 420 updates the instance of the shared state at 324. The key-value pair for virtual service 440 and the requesting client with the score for service engine 420 is updated. If rules for web application policy 442 indicate that traffic violations are tracked on a per-client basis and the request received at service engine 420 is from a different client as discussed above for service engine 410, then a different value is updated. In other words, the key-value pair for virtual service 440 and a different client is updated. If rules for web application policy 442 indicate that traffic violations are tracked on a per-client basis and the request received at service engine 420 is from the same client as discussed above for service engine 410, then the same key-value pair is updated. If rules for web application policy 442 indicate that traffic violations are not tracked on a per-client basis, then any request received at service engine 420 for virtual service 440 results in the same key-value pair being updated. Thus, the appropriate key-value pair for virtual service 440 has the score for service engine 420 updated. This is shown in FIG. 10, in which instance 444B' has been updated and is shown as 444B". Service engine 420 broadcasts the updated instance of the shared state via 326. Thus, the key-value pair for service engine 420 and virtual service 440 is broadcast. Service engines 410 and 430 receive the broadcast and update their own shared state at 328. FIG. 11 depicts system 400 after this has occurred. Thus, instances 444A' and 444C' of the shared state are updated to 444A" and 444C'", respectively, to include the new value (e.g. score) for service engine 420. Scores may still be aggregated, it may be determined whether aggregated scores trigger enforcement of rules, rules may be enforced and enforcement may be terminated at 330, 332, 334, 336 and 338.

A stateful web application policy may be maintained for distributed service platform 400 using the method 320. The number of service engines and virtual services for system 400 may be scaled up to service larger amounts of traffic. Thus, large volumes of traffic may be managed in a scalable manner. Management of web application firewall policies is also performed in a stateful manner. Thus, traffic violations which occur on one service engine 410, 420 and 430 are also known at all service engines having the same virtual service due to the updates and broadcasts performed in method 320. Further, penalties may be enforced across all service engines regardless of which service engine 410, 420 and 430 experienced the violation triggering enforcement of a rule. This allows service engines 410, 420 and 430 to remain in a coherent state and network security to be maintained. Further, system 400 and method 320 may be resilient to drops of messages. Because each service engine 410, 420 and 430 maintains its own state accurately and broadcasts its state, eventually state information is broadcast across the system 400 even if some messages are dropped. Thus, a web application policy may be reliably maintained in a stateful manner in a scalable distributed system capable of servicing large amounts of traffic.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for monitoring requests for a distributed service performed collectively by a plurality of service engines executing on a set of host computers, each service engine in the plurality of service engines storing an instance of a shared state for policy violations associated with the distributed service, the method comprising:
   at a first service engine in the plurality of service engines that collectively perform the same distributed service, the first service engine executing on a host computer in the set of host computers:
      detecting that a request received from a particular source violates a policy associated with the distributed service that is performed by the first service engine and other service engines in the plurality of service engines, each service engine in the plurality of service engines enforcing a common set of service policies to perform the distributed service;
      in response to detecting that the request violates the policy, updating a first instance of the shared state stored by the first service engine;
      to ensure that all the service engines in the plurality of service engines have a consistent view of policy violations by requests received at all the service engines in the plurality of service engines, broadcasting the updated first instance of the shared state to other service engines in the plurality of service engines, wherein each other service engine updates a corresponding instance of the shared state in response to reception of the updated first instance of the shared state;
      examining an aggregated shared state across all the service engines in the plurality of service engines to determine that the aggregated shared state triggers an application of a security rule to subsequent requests associated with the distributed service; and
      applying the security rule to subsequent requests associated with the distributed service.

2. The method of claim 1, wherein the aggregated shared state indicates a plurality of policy violations by a plurality of requests received at the plurality of service engines.

3. The method of claim 1, wherein the distributed service is only one of a firewall service or a load balancing service.

4. The method of claim 1, wherein the aggregated shared state includes an aggregated score from the plurality of service engines and wherein examining the aggregated shared state comprises:
   determining whether the aggregated score exceeds a threshold.

5. The method of claim 1 wherein the plurality of service engines is part of a larger set of service engines associated with the distributed service and are a statistically sufficient representation, of a total number of service engines in the larger set of service engines, for the monitoring of the requests for assessing policy violations and triggering secure rule applications for the distributed service.

6. The method of claim 1, wherein the security rule blocks additional requests from a client contributing to the aggregated shared state in response to examining the aggregated shared state to determine that the aggregated shared state triggers the application of the security rule.

7. The method of claim 6, wherein the blocking the additional requests from the client is performed for a particular interval.

8. The method of claim 6, wherein the blocking the additional requests from the client is performed for a particular number of the additional requests.

9. The method of claim 6, wherein the blocking the additional requests from the client further includes:
   receiving a reset command; and
   allowing new requests from the client in response to the reset command.

10. A system for monitoring requests for a distributed service performed collectively by a plurality of service engines executing on a set of host computers, each service engine in the plurality of service engines storing an instance of a shared state for policy violations associated with the distributed service, the system comprising:
    at least one processor configured to:
       detect that a request received from a particular source violates a policy associated with the distributed service that is performed by a first service engine and other service engines in the plurality of service engines, each service engine in the plurality of service engines enforcing a set of service policies that is common to all the service engines in the plurality of service engines in order to perform the distributed service;
       update a first instance of the shared state stored by the first service engine in response to detecting that the request violates the policy;
       broadcast the updated first instance of the shared state to other service engines in the plurality of service engines to ensure that all the service engines in the plurality of service engines have a consistent view of policy violations by requests received at all the service engines in the plurality of service engines, wherein each other service engine updates a corresponding instance of the shared state in response to reception of the updated first instance of the shared state;
       examine an aggregated shared state across all the service engines in the plurality of service engines to determine that the aggregated shared state triggers an application of a security rule to subsequent requests associated with the distributed service; and
       apply the security rule to subsequent requests associated with the distributed service; and
    at least one memory coupled to the at least one processor and configured to provide the at least one processor with instructions.

11. The system of claim 10, wherein the aggregated shared state indicates a plurality of policy violations by a plurality of requests received at the plurality of service engines.

12. The system of claim 10, wherein the distributed service is only one of a firewall service or a load balancing service.

13. The system of claim 10, wherein the aggregated shared state includes an aggregated score from the plurality of service engines and wherein to determine that the aggregated shared state triggers the application of the security rule, the at least one processor is further configured to:
  determine whether the aggregated score exceeds a threshold.

14. The system of claim 10 wherein the plurality of service engines is part of a larger set of service engines associated with the distributed service and are a statistically sufficient representation, of a total number of service engines in the larger set of service engines, for the monitoring of the requests for assessing policy violations and triggering secure rule applications for the distributed service.

15. The system of claim 10, wherein the at least one processor is further configured to:
  block additional requests from a client contributing to the aggregated shared state in response to examining the aggregated shared state to determine that the aggregated shared state triggers the application of the security rule.

16. The system of claim 15, wherein the at least one processor is configured to block the additional requests from the client for a particular interval.

17. The system of claim 15, wherein the at least one processor is configured to block the additional requests from the client for a particular number of the additional requests.

18. The system of claim 15, wherein the at least one processor is further configured to:
  receive a reset command; and
  allow new requests from the client in response to the reset command.

19. A computer program product for monitoring requests for a distributed service performed collectively by a plurality of service engines executing on a set of host computers, each service engine in the plurality of service engines storing an instance of a shared state for policy violations associated with the distributed service, the computer program product stored on a tangible computer readable storage medium and comprising sets of computer instructions for implementing a first service engine in a plurality of service engines executing on a host computer in a set of host computers, the sets of instructions for:
  detecting that a request received from a particular source violates a policy associated with the distributed service that is performed by the first service engine and other service engines in the plurality of service engines, each service engine in the plurality of service engines enforcing a common set of service policies to perform the distributed service;
  in response to detecting that the request violates the policy, updating a first instance of the shared state stored by the first service engine;
  to ensure that all the service engines in the plurality of service engines have a consistent view of policy violations by requests received at all the service engines in the plurality of service engines, broadcasting the updated first instance of the shared state to other service engines in the plurality of service engines, wherein each other service engine updates a corresponding instance of the shared state in response to reception of the updated first instance of the shared state;
  examining an aggregated shared state across all the service engines in the plurality of service engines to determine that the aggregated shared state triggers an application of a security rule to subsequent requests associated with the distributed service; and
  applying the security rule to subsequent requests associated with the distributed service.

20. The computer program product of claim 19, wherein the aggregated shared state indicates a plurality of policy violations by a plurality of requests received at the plurality of service engines.

21. The computer program product of claim 19, wherein the distributed service is only one of a firewall service or a load balancing service.

22. The computer program product of claim 19, wherein the aggregated shared state includes an aggregated score from the plurality of service engines and wherein the set of instructions for examining the aggregated shared state comprises a set of instructions for:
  determining whether the aggregated score exceeds a threshold.

23. The computer program product of claim 19, wherein the security rule blocks additional requests from a client contributing to the aggregated shared state in response to examining the aggregated shared state to determine that the aggregated shared state triggers the application of the security rule.

24. The computer program product of claim 23, wherein the instructions for blocking the additional requests from the client are performed for a particular interval.

25. The computer program product of claim 23, wherein the instructions for blocking the additional requests from the client are performed for a particular number of the additional requests.

26. The computer program product of claim 23, wherein the instructions for blocking the additional requests from the client further include instructions for:
  receiving a reset command; and
  allowing new requests from the client in response to the reset command.

* * * * *